Nov. 2, 1965 JUNJI YAMATO ETAL 3,215,991

INFORMATION STORAGE APPARATUS

Filed May 3, 1960 2 Sheets-Sheet 1

INVENTORS
JUNJI YAMATO
YASUNOBU SUZUKI

BY Joseph Weingarten

ATTORNEY

Nov. 2, 1965 JUNJI YAMATO ETAL 3,215,991

INFORMATION STORAGE APPARATUS

Filed May 3, 1960 2 Sheets-Sheet 2

*INVENTORS*
JUNJI YAMATO
YASUNOBU SUZUKI
*BY* Joseph Weingarten
ATTORNEY

United States Patent Office 3,215,991
Patented Nov. 2, 1965

3,215,991

INFORMATION STORAGE APPARATUS

Junji Yamato and Yasunobu Suzuki, Tokyo, Japan, assignors to Nippon Telegraph & Telephone Public Corporation, Tokyo, Japan, a firm of Japan Filed May 3, 1960, Ser. No. 26,514
Claims priority, application Japan, May 8, 1959, 34/14,444
1 Claim. (Cl. 340—174)

This invention relates in general to data processing equipment and more particularly pertains to apparatus providing a fixed store of information, sometimes referred to as a permanent memory, of the type which can be repetitively drawn upon without destroying or altering any of the information contained in the store. Permanent memory devices are widely used in computation machines, especially of the large electronic type, and to control the operation of automatic telephone switchboards and industrial machines.

Several different types of permanent memory devices are in current use, the most common type being memory systems employing perforated cards. In such a system, the perforated cards may be of cardboard or of metal, the perforations in the cards being spaced in accordance with the information stored thereon. The cards are usually held in a stack and a mechanism is provided for selecting any desired card. The information stored on the selected card can be obtained by directing beams of light through the perforations in the card and using an array of photosensitive elements to detect the beams of light that go through the perforations in the card.

Memory devices consisting of magnetic ferrite cores arranged in matrixes have emerged in recent years as one of the outstanding digital storage mediums. Magnetic core matrix storage devices are described in detail in chapter VIII in "Digital Computer Components and Circuits" by R. K. Richards, published by D. Van Nostrand Company. The usual magnetic core matrix is a rectangular array of ferrite cores arranged in horizontal rows and vertical columns, each vertical column being threaded by a drive winding and each row being threaded by an output winding. The storage mechanism of the ferrite core is based on its rectangular hysteresis loop properties and each of the cores in the memory matrix is in either a ONE state or a ZERO state depending on the direction in which the lines of magnetic flux pass around the toroidal core. To ascertain whether a ZERO or a ONE is stored in any core in a column, a current is passed through the column drive winding in a direction causing the cores to be set to the ZERO state. If the core is already in the ZERO state, there will be no change of flux in the core, and no output voltage will be induced in the output winding of the core. However, where the core is in the ONE state, the reversal of the direction of the flux in the core induces a voltage in the output winding indicating that the digit ONE was stored in the core. Since the sensing of the winding leaves the core in the ZERO state, circuits are provided to return the core to the ONE state each time a ONE is sensed.

The perforated card system of information storage has a number of disadvantages among which are (1) its slow operational speed where a large number of cards are involved because the selecting mechanism must scan each card until the desired card is reached, (2) the associated apparatus requires highly precise machined parts, and (3) continual sorting of the cards causes wear of the precision machined parts and therefore the apparatus tends to become more unreliable as it ages.

Magnetic core matrix memory devices do not suffer from the disadvantages associated with the perforated card memory system. The principal drawback of the magnetic core matrix memory device is that the information stored in it cannot be easily changed once the cores have been wound, since any change requires rewinding of the core at each location where the information is altered.

In addition to the perforated card and core matrix memory devices, a third type of permanent memory currently in use is the magnetic drum. The drum is a circular cylinder having a coating of magnetic material on the peripheral surface. The drum is rotated around the axis of the cylinder and magnetic heads for reading are mounted in close proximity to the magnetic surface, each reading head having access to information recorded on one "track" around the circumference of the drum. Magnetic drum storage devices tend to be bulky and because that system has moving parts it is subject to wear and to the maintenance problems associated with rotating devices.

The principal object of the invention is to provide a permanent memory device which is reliable in operation, has no moving parts, is reasonably fast in operation, and in which the stored information can be readily changed.

A secondary object of the invention is to provide a permanent memory device which is reliable in operation and yet can be manufactured by mass production techniques so that it is relatively inexpensive.

The invention resides in an arrangement of sensing coils arrayed in columns and driver coils arrayed in rows in a direction orthogonal to the columns, the driver coils being positioned in relation to the sensing coils so that each driver coil is juxtaposed to a different sensing coil. A plate of highly permeable material is inserted between the sensing coils and driver coils, the plate having apertures whose arrangement constitutes the stored information, that information being coded in the binary system in which an aperture represents a ONE, for example, and the absence of an aperture represents a ZERO. A switching network is provided to couple high frequency energy to selected driver coils whereby an electromagnetic field is established by each energized driver coil. Where the highly permeable plate presents a continuous wall between the driver and its juxtaposed sensing coil, the wall short circuits the magnetic flux and prevents the electromagnetic field from affecting the adjacent sensing coil, but where an aperture is present, the electromagnetic field protrudes through the opening and induces an electromotive force in the adjacent sensing coil. Thus, an induced voltage in a sensing coil represents a binary ONE output, whereas the absence of an induced voltage in a sensing coil represents a binary ZERO. The stored information can be easily changed merely by removing the apertured plate and inserting a differently coded plate in its place.

The construction of a preferred embodiment of the invention and its mode of operation can be better understood by a perusal of the following detailed exposition when considered in conjunction with the accompanying drawings in which.

Figure 1:
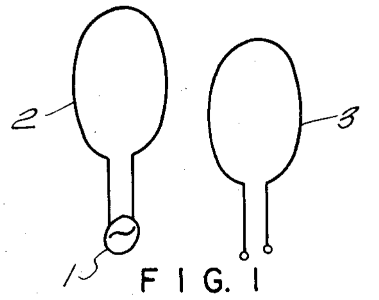
FIG. 1 illustrates the principle of electromagnetic induction.
Figure 2:
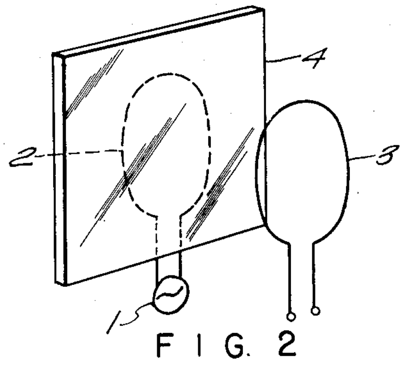
FIG. 2 shows a magnetic shield interposed between two coils.

The principles underlying the invention may be understood by considering FIG. 1 in which a source of high frequency electrical signals 1 is connected to a coil 2, known as the driver coil, consisting of a single turn of conductive wire, and a second coil 3, known as the sensing coil, also having a single turn is placed in the electromagnetic field established by the current flowing in the driven coil so that a high frequency electromotive force (E.M.F.) is induced in the sensing coil. Where a highly permeable plate 4, of a ferromagnetic material, is inserted between the coils 2 and 3, as depicted in FIG. 2, the high frequency magnetic flux incident on the plate is short circuited by the low reluctance path offered by the highly permeable material so that coil 3 is effectively shielded and no E.M.F. is induced in it. If the plate is provided with an aperture 5, as shown in FIG. 3, of sufficient size to permit some of the magnetic flux to pass and cut the sensing coil, an E.M.F. will be induced in coil 3.

Figures 3, 4, 5, 6:
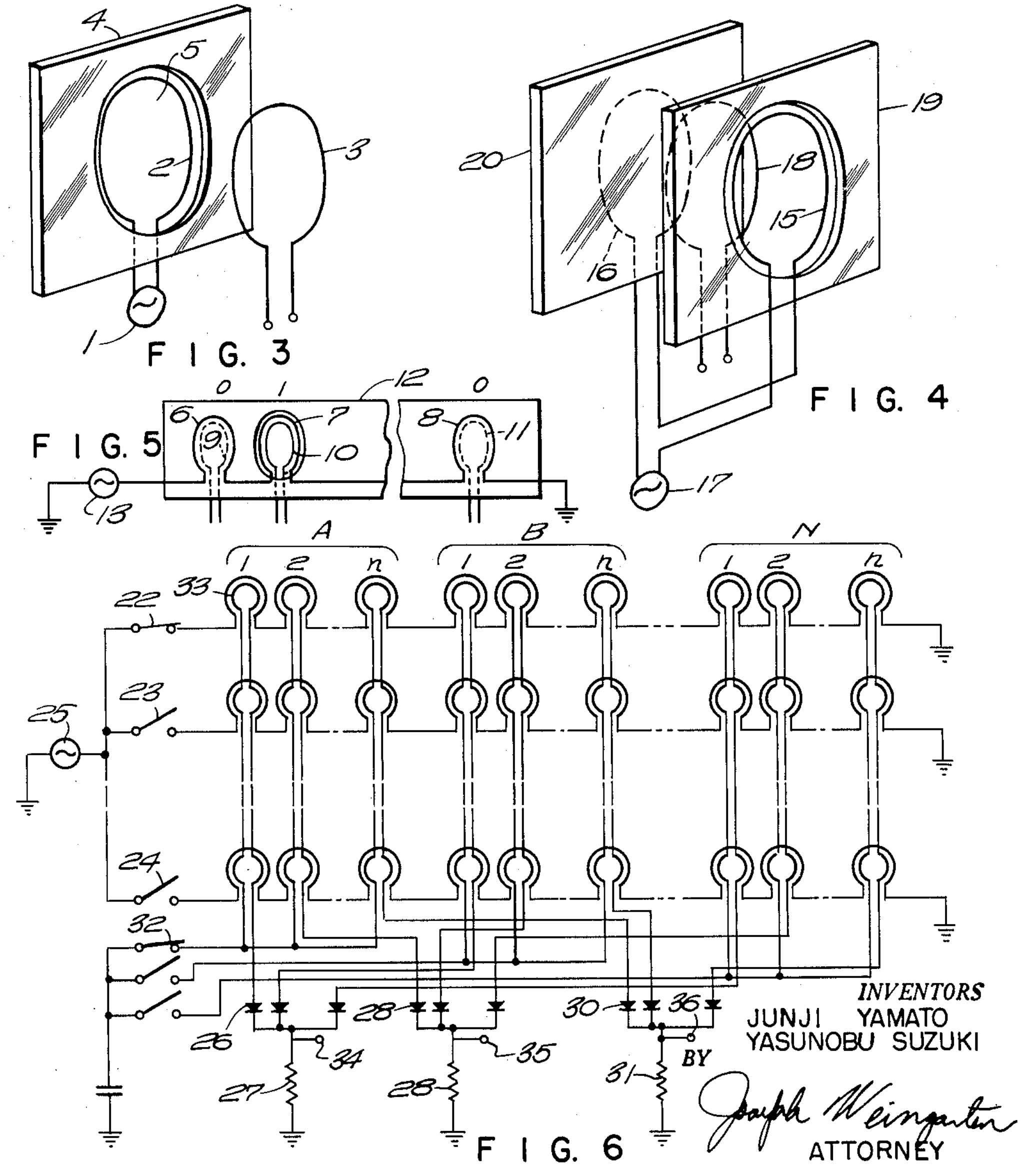
FIG. 3 depicts a magnetic shield having an aperture for permitting an electromagnetic field to extend through the shield.
FIG. 4 illustrates an employment of the principles of electromagnetic induction and magnetic shielding.
FIG. 5 depicts a coded plate interposed between driver and sensing coils.
FIG. 6 illustrates driver and sensing coils arranged in accordance with the grouping of binary bits into words.

An information store utilizing the foregoing principles can be formed by serially connecting a number of driver coils 6, 7, 8 in a row, as shown in FIG. 5, positioning a different sensing coil 9, 10, 11 adjacent each driver coil, and inserting a magnetically permeable plate 12 between the driver coils and the sensing coils, the plate being provided with apertures in conformity with the stored information. For example, assume the information is arranged in words, each word consisting of six binary bits and that the word is represented in binary notation by 010100. An aperture is made in the plate 12 where a ONE is desired from the sensing winding and the plate is left imperforate where a ZERO is desired. By energizing the row of driver coils from a source 13 of high frequency signals, no voltage is obtained from sensing coil 9 because the plate 12 forms a solid wall between it and driver coil 6. Hence, the output of sensing winding 9 is a ZERO. The next sensing coil 10, however, provides an output voltage because the plate 12 has an aperture in it permitting the field established by driver coil 7 to protrude through the opening. The output voltage of sensing coil 10 signifies a ONE. The last bit in the word is a ZERO and therefore the plate is imperforate between coil 8 and 11. It is apparent that the presence or absence of a perforation in the plate determines whether a ONE or a ZERO is produced at the output of the sensing coil. The aperture, of course, must be so spaced that it occurs between a driver coil and its associated sensing coil.

Turning now to FIG. 4, there is shown a pair of driver coils 15 and 16 connected to a high frequency source 17 in a manner such that the currents in the two driver coils are 180° out of phase. Thus, where the current in coil 15 is circulating clockwise, the current in coil 16 is flowing counter-clockwise and when the directions of the currents reverse, they reverse simultaneously in both coils. The sensing coil 18 is located between and in alignment with the driver coils. A perforated plate 19 is inserted between coils 15 and 18 so that the electromagnetic field of driver coil 15 can impinge upon the sensing coil and an imperforate plate 20 is placed between coils 16 and 18 so that the sensing coil is shielded from the field established by current flowing in driver coil 16. Now, the instantaneous polarity of the E.M.F. existing across the output terminals of sensing coil 18 depends upon the direction of current flow in driver coil 15. If the plates 19 and 20 are interchanged in position, the output E.M.F. of sensing coil 18 would be reversed in polarity because of the 180° difference in currents in the two driver coils. Thus the plates 19 and 20 can be coded in such fashion that a ZERO is represented by an induced E.M.F. of one polarity, positive polarity, for example, and a ONE is than represented by an induced E.M.F. of the opposite polarity, that is, a negative E.M.F. For example, the plate 19 would have an aperture where a ONE output is to be produced and the plate 20 would have an aperture where a ZERO output is to be produced. The plate 20 can therefore be viewed as complementary to plate 19. The structure of FIG. 4 differs from the structure of FIG. 5 in that the structure of FIG. 4 is organized so that output voltages for either a ZERO or a ONE is produced, the polarity of the output determining the value of the binary bit, whereas in the structure of FIG. 5 an output voltage is produced only if the binary bit is a ONE and no output voltage is produced if the binary bit is a ZERO.

FIG. 6 illustrates the driver and sensing coils arranged to form a storage matrix. The driver coils are arranged in horizontal rows, only three rows being illustrated although it is understood that as many rows may be employed as desired. All the driver coils in a row are serially connected and each row is coupled through a switch 22, 23, or 24 to a signal source 25. While the switches are shown to be of the mechanical type, for simplicity, they are actual electronic switches, transistors being conventional for this purpose. The sensing coils are arranged in vertical columns, all the coils in each column being serially connected. The vertical columns of sensing coils are divided into groups as indicated by the brackets A, B, . . . N, each group having as many columns in it as there are bits in a word. Thus, the columns in each group are labeled 1, 2, . . . *n* to indicate the digital bit in the word to which each column corresponds. The first column in group A is connected at one end through a diode 26 to a resistor 27 which is grounded. The second column in group A has one end connected through a diode 28 and resistor 29 to ground. And the *n*th column in group A is likewise connected to ground through a diode 30 in series with a resistor 31. Similarly for the other groups, the first column is connected by a diode to resistor 27, the second column is connected by a diode to resistor 29, and the *n*th column is connected by a diode to resistor 31. The circuits for all the columns in group A are simultaneously completed to ground by closing switch 32. A switch is similarly provided for each of the other groups whereby all the columns in the group simultaneously have their circuits completed by closing of the switch. The outputs are derived from across resistors 27, 29, and 31.

It must be remembered that an apertured plate is inserted between the sensing coils and the driver coils, the spacing of the apertures on the plate representing the stored information. To read the first word stored on the coded plate, switches 22 and 32 are closed while all the other switches are left open. A high frequency current from source 25 flows through the driver coils in the topmost row. At those locations where there are apertures in the coded plate, the sensing coils have an E.M.F. induced in them while at those locations where there are no apertures, the sensing coils are shielded so that no E.M.F. is induced. Assume, for example, that an E.M.F. is induced in the sensing coil 33 of column 1. By virture of that induced E.M.F., a rectified current flows through diode 26 and resistor 27 so that a potential drop occurs across resistor 27 thereby indicating that the first bit in the word is a binary ONE. An absence of voltage at terminal 34, on the other hand, would have indicated a binary ZERO. The output signal for the second binary bit in the word is obtained from terminal 35, and the output signal for the *n*th bit is obtained from terminal 36. By appropriately setting the switches, any word can be read out of the information storage system.

Figure 7:
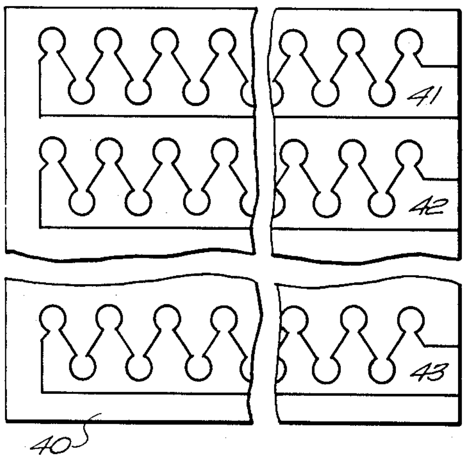
FIGS. 7 and 8 depict the driver and sensing coils as printed circuits.
Figure 8:
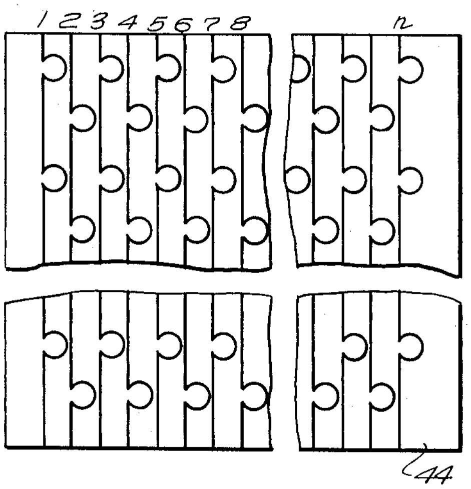
Figure 9:
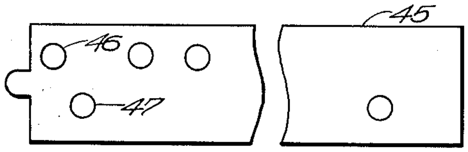
FIG. 9 shows a coded plate.

The invention lends itself to mass production because all the parts except the coded cards can be readily standardized. FIG. 7 depicts an insulative circuit board 40 on which is printed, by conventional techniques, rows 41, 42, 43 of serially connected driver coils, each coil being formed by a single loop. FIG. 8 depicts an insulative circuit board 44 on which is printed columns of serially connected sensing coils. After the printed wiring is formed, the boards may be coated with a film of an insulative non-magnetic material, preferably a plastic. FIG. 9 shows a plate 45 of highly permeable material. The plate is provided with apertures, such as the apertures 46, 47 arranged to constitute coded information. It will be noted that if the plate 45 is superposed on any row in FIG. 7, all the apertures can simultaneously be brought into register with the driver coils.

Figure 11:
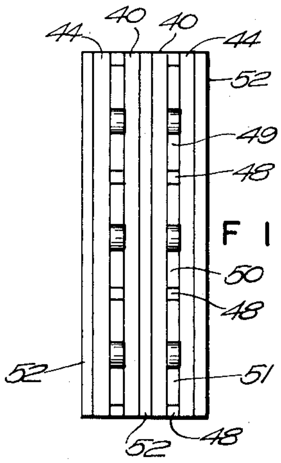
FIGS. 10 and 11 depict a sandwich construction employing printed circuit boards.
Figure 10:
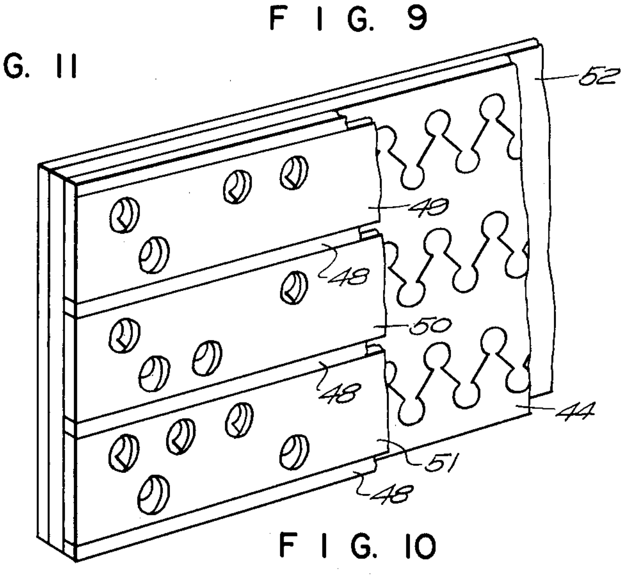

FIGS. 10 and 11 illustrate the manner in which the circuit boards of FIGS. 7 and 8 are utilized to form a cellular structure accommodating a number of coded plates. As shown in FIG. 11, the printed sides of boards 40 and 44 are arranged face to face so that the columns of sensing coils are transverse to the rows of driver coils. Spacers 48 are disposed between the boards 40 and 44 so that cells are formed in which coded plates 49, 50, 51 of the type shown in FIG. 9 can be inserted. Of course, the structure must be arranged so that when the coded plates are fully inserted the apertures in the plates come into registry with the driver and sensing coils, as depicted in FIG. 10. To prevent stray magnetic fields from affecting the sensing coils, the structure is shielded by highly permeable sheets 52. A number of such cellular structures may be arranged side-by-side in the manner shown in FIG. 11.

While the invention has been embodied in a structure having a coded plate which determines the degree of inductive coupling between each pair of driver and sensing coils, the invention can also be embodied in a structure in which a coded plate determines the amount of electrostatic induction between a pair of electrodes forming the plates of a capacitor. In the latter embodiment the coded plate can be constituted by a dielectric material and in place of the apertures, discs having a dielectric constant greatly different from the constant of the plate material may be substituted.

With regard to the electromagnetic inductive structure disclosed herein, it is apparent that the coded plate may be made of a diamagnetic or paramagnetic material, in which case the apertures would take the form of inserted ferromagnetic discs.

What is claimed is:

Information storage apparatus comprising a plurality of columns of sensing coils, the sensing coils in each column being serially connected, a plurality of driver coils, the driver coils in each row being serially connected, the rows of driver coils being transverse to the columns of sensing coils, the rows of driver coils being arranged in pairs, the columns of sensing coils passing between the rows of each pair whereby each sensing coil is disposed between two driver coils, means for energizing the driver coils in the pairs of rows to cause the current in the coils of one row to be out of phase with respect to the current in the coils of the other row of the pair, a first magnetic shield interposed between the columns of sensing coils and those rows of driver coils which are disposed on one side of the sensing coils, and a second magnetic shield interposed between the columns of sensing coils and those rows of driver coils which are disposed on the opposite side of the sensing coils, the shields having apertures therein corresponding to the stored information, each aperture being disposed to permit a sensing coil to be inductively coupled to a contiguous driver coil.

References Cited by the Examiner

UNITED STATES PATENTS

| | | | |
|---|---|---|---|
| 2,187,115 | 1/40 | Ellwood | 340—174 X |
| 2,770,796 | 11/56 | Boer | 340—174.1 |
| 2,820,216 | 1/58 | Grottrup | 340—174 |
| 2,981,935 | 5/61 | Nasoni | 340—174 |
| 3,027,548 | 3/62 | Vaughan | 340—174 |

IRVING L. SRAGOW, *Primary Examiner.*

EVERETT R. REYNOLDS, *Examiner.*